US009689320B2

United States Patent
Yagi et al.

(10) Patent No.: US 9,689,320 B2
(45) Date of Patent: Jun. 27, 2017

(54) FUEL SUPPLY APPARATUS AND FUEL SUPPLY METHOD

(71) Applicant: Yanmar Co., Ltd., Osaka (JP)

(72) Inventors: Yukio Yagi, Osaka (JP); Ee Hong Chng, Osaka (JP); Yuuki Ootomo, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 194 days.

(21) Appl. No.: 14/559,590

(22) Filed: Dec. 3, 2014

(65) Prior Publication Data

US 2015/0107677 A1 Apr. 23, 2015

Related U.S. Application Data

(62) Division of application No. 12/742,392, filed as application No. PCT/JP2008/070664 on Nov. 13, 2008, now abandoned.

(30) Foreign Application Priority Data

Nov. 15, 2007 (JP) ................................ 2007-297060

(51) Int. Cl.
*B01F 15/00* (2006.01)
*F02D 19/06* (2006.01)
(Continued)

(52) U.S. Cl.
CPC ..... *F02D 19/0605* (2013.01); *F02D 19/0628* (2013.01); *F02D 19/0634* (2013.01);
(Continued)

(58) Field of Classification Search
CPC .. F02D 19/0605; F02D 19/0657; Y02T 10/36; Y10T 137/0324; Y10T 137/6416;
(Continued)

(56) References Cited

U.S. PATENT DOCUMENTS

| | | |
|---|---|---|
| 3,022,425 A | 2/1962 | Rockstead |
| 3,415,264 A | 12/1968 | Brown et al. |

(Continued)

FOREIGN PATENT DOCUMENTS

| | | |
|---|---|---|
| DE | 3100322 A1 | 7/1982 |
| JP | 56-086992 A | 7/1981 |

(Continued)

OTHER PUBLICATIONS

U.S. Appl. No. 12/742,392, Final Office Action mailed Jun. 4, 2014, 10 pgs.

(Continued)

*Primary Examiner* — Tony G Soohoo
(74) *Attorney, Agent, or Firm* — Schwegman Lundberg & Woessner, P.A.

(57) ABSTRACT

The temperatures of fuel oils stored in fuel tanks 12a, 12b, 12c are separately detected by temperature sensors 52a, 52b, 52c, respectively. Based on the detection results, a CPU 49 heats a heat resistant fuel oil among the fuel oils using a heat exchanger 54, such that the temperature of an oil mixture generated by mixing the fuel oils satisfies a predetermined temperature condition. After the fuel oils including the heated heat resistant fuel oil are mixed in a blender 13, the CPU 49 detects the viscosity of the generated oil mixture using a viscometer 33. Thereafter, based on the detection result, the CPU 49 controls the mixture ratio or a heating temperature of the heat resistant fuel oil, such that the viscosity of the oil mixture satisfies a predetermined viscosity condition.

2 Claims, 2 Drawing Sheets

(51) Int. Cl.
*F02D 19/08* (2006.01)
*F02M 31/125* (2006.01)
*F02M 37/00* (2006.01)

(52) U.S. Cl.
CPC ..... *F02D 19/0655* (2013.01); *F02D 19/0657* (2013.01); *F02D 19/0676* (2013.01); *F02D 19/081* (2013.01); *F02M 31/125* (2013.01); *F02M 37/0064* (2013.01); *B01F 15/00175* (2013.01); *B01F 15/00207* (2013.01); *B01F 15/00396* (2013.01); *B01F 2215/0067* (2013.01); *B01F 2215/0088* (2013.01); *F02D 19/0665* (2013.01); *Y02T 10/126* (2013.01); *Y02T 10/36* (2013.01); *Y10T 137/0318* (2015.04); *Y10T 137/0324* (2015.04); *Y10T 137/6416* (2015.04)

(58) Field of Classification Search
CPC .......... B01F 15/00396; B01F 15/00207; B01F 15/00175; B01F 2215/0067; B01F 2215/0088
See application file for complete search history.

(56) References Cited

U.S. PATENT DOCUMENTS

| | | | |
|---|---|---|---|
| 4,031,864 A | | 6/1977 | Crothers |
| 4,393,854 A | | 7/1983 | Tacquet |
| 4,402,296 A | | 9/1983 | Schwarz |
| 4,413,604 A | | 11/1983 | Tune |
| 4,452,265 A | * | 6/1984 | Lonnebring ............ B01F 3/088 137/13 |
| 4,471,744 A | * | 9/1984 | Holtz ...................... F02B 69/02 123/304 |
| 4,625,701 A | | 12/1986 | Bartlett et al. |
| 5,033,644 A | | 7/1991 | Tentler |
| 5,105,063 A | | 4/1992 | Hockemier |
| 5,117,800 A | | 6/1992 | Watson et al. |
| 5,213,086 A | | 5/1993 | Sims |
| 5,263,850 A | | 11/1993 | Walker |
| 5,343,699 A | | 9/1994 | Mcalister |
| 5,979,420 A | | 11/1999 | Kawamura |
| 6,216,528 B1 | | 4/2001 | Carrell et al. |
| 8,006,677 B2 | * | 8/2011 | Williams ............ F02D 19/0605 123/575 |
| 8,381,701 B2 | | 2/2013 | Sugioka et al. |
| 8,584,657 B2 | * | 11/2013 | Yagi ................... F02D 19/0628 123/1 A |
| 2003/0163994 A1 | * | 9/2003 | Kuramoto ................. F02C 9/40 60/776 |
| 2006/0090727 A1 | | 5/2006 | Weissman et al. |
| 2007/0062496 A1 | | 3/2007 | Snower et al. |
| 2007/0175459 A1 | * | 8/2007 | Williams ............ F02D 19/0605 123/575 |
| 2008/0163854 A1 | | 7/2008 | Karner |
| 2008/0257301 A1 | | 10/2008 | Hotta et al. |
| 2009/0314260 A1 | | 12/2009 | Maeda et al. |
| 2010/0139627 A1 | * | 6/2010 | Verhein ............... F02D 19/0605 123/553 |
| 2011/0000549 A1 | | 1/2011 | Yagi et al. |
| 2011/0168137 A1 | * | 7/2011 | Yagi ................... F02D 19/0628 123/510 |

FOREIGN PATENT DOCUMENTS

| | | |
|---|---|---|
| JP | 57-97061 A | 6/1982 |
| JP | 59-90734 A | 5/1984 |
| JP | 61-48961 U | 4/1986 |
| JP | 62158917 A | 7/1987 |
| JP | 63-50658 A | 3/1988 |
| JP | 63-112266 A | 5/1988 |
| JP | 63-112266 U | 7/1988 |
| JP | 03-503196 | 7/1991 |
| JP | 05-61450 U | 8/1993 |
| JP | 2000-34959 A | 2/2000 |
| JP | 2001-214822 A | 8/2001 |
| JP | 2002-168139 A | 6/2002 |
| JP | 2005-127279 A | 5/2005 |
| WO | WO-2006/013578 A1 | 2/2006 |
| WO | WO 2012/136208 * | 10/2012 |

OTHER PUBLICATIONS

U.S. Appl. No. 12/742,392, Non Final Office Action mailed Feb. 21, 2014, 11 pgs.
U.S. Appl. No. 12/742,392, Preliminary Amendmentfiled May 11, 2010, 11 pgs.
U.S. Appl. No. 12/742,392, Response filed Jan. 20, 2014 to Restriction Requirement mailed Dec. 20, 2013, 7 pgs.
U.S. Appl. No. 12/742,392, Response filed May 21, 2014 to Non Final Office Action mailed Feb. 21, 2014, 8 pgs.
U.S. Appl. No. 12/742,392, Restriction Requirement mailed Dec. 20, 2013, 6 pgs.
U.S. Appl. No. 12/742,410, Notice of Allowance mailed Jul. 15, 2013, 8 pgs.
International Application Serial No. PCT/JP2008/070663, International Preliminary Report on Patentability issued Jun. 29, 2010, (w/ English Translation of Written Opinion), 7 pgs.
International Application Serial No. PCT/JP2008/070663, International Search Report mailed Dec. 9, 2008, 2 pgs.
International Application Serial No. PCT/JP2008/070664, International Preliminary Report on Patentability dated Feb. 9, 2010, (w/ English Translation), 14 pgs.
International Application Serial No. PCT/JP2008/070664, International Search Report mailed Dec. 16, 2008, 2 pgs.
International Application Serial No. PCT/JP2008/070664, Written Opinion mailed Dec. 16, 2008, 4 pgs.
"European Application Serial No. 08850703.3, Extended European Search Report mailed Feb. 25, 2015", 8 pgs.
Jensen, F. Q., "1st schwefelarmer Kraftstoff eine Herausforderung für den Zweitakt-Schiffsdieselmotor?", *Maschinenbau Engineering*, (2005), 41-46.
European Application No. 08850819,7, Extended Search Report mailed Aug. 28, 2015, 4 pgs.

* cited by examiner

Fig.3(a) Fig.3(b)

FUEL SUPPLY APPARATUS AND FUEL SUPPLY METHOD

CROSS REFERENCE TO RELATED APPLICATIONS

This application is a divisional of and claims the benefit of priority under 35 U.S.C. §120 to U.S. patent application Ser. No. 12/742,392, filed on Sep. 9, 2010, which is a nationalization under 35 U.S.C. 371 of PCT/JP2008/070664, filed Nov. 13, 2008 and published as WO 2009/063934 A1 on May 22, 2009, which application claims priority to and the benefit of Japanese Patent Application No. 2007-297060, filed Nov. 15, 2007; each of which applications and publication are incorporated herein by reference in their entirety, and the priority of each of which is claimed herein.

TECHNICAL FIELD

The present invention relates to a fuel supply apparatus and a fuel supply method for supplying as fuel an oil mixture made by mixing various types of oils.

BACKGROUND ART

In recent years, the increase in performance of diesel engines has enabled oil mixture to be used as fuel other than light oils or heavy oils, which are used alone. The oil mixture refers to a type of oil made by mixing multiple types of oils having different viscosities. Accordingly, inexpensive low-quality oil having a viscosity higher than that of high-quality oil such as light oil has been selected as a material of the oil mixture. This reduces fuel costs.

For such an oil mixture, not only oils having low viscosities, but also oils having high viscosities are used as materials, taking into consideration the prices of the fuels. To use oil mixture as fuel, the viscosity of the oil mixture itself is adjusted. For example, Patent Document 1 discloses a fuel supply apparatus for supplying oil mixture as described above to an engine. In this fuel supply apparatus, the viscosity of oil mixture, which has been generated by mixing various oils, is detected in a supply passage for supplying the oil mixture to an engine. Based on the detection result, the oil mixture is heated in the supply passage leading to the engine to adjust the viscosity of the oil mixture, such that the viscosity becomes appropriate for use in a diesel engine.

However, in the above fuel supply apparatus, the oils constituting the oil mixture can include components that can be oxidized and degraded by heating the oil mixture to adjust the viscosity. Particularly, in recent years, biodiesel fuel, which is obtained by refining plant-derived oil and waste edible oil, has received a lot of attention as a circulation type energy. Use of oil mixture obtained by mixing these oils with light oil or heavy oil has been proposed. However, in general, biodiesel fuel is easily oxidized and degraded by heat. Therefore, in the case where such an oil mixture is used as fuel, degradation of the fuel due to oxidation generates polymer substances, which can clog filters.

Patent Document 1: Japanese Laid-Open Patent Publication No. 2005-127279

DISCLOSURE OF THE INVENTION

Accordingly, it is an objective of the present invention to provide a fuel supply apparatus and a fuel supply method that keep the viscosity of fuel in a range of a predetermined condition, while suppressing degradation of the fuel due to oxidation.

To achieve the foregoing objective and in accordance with a first aspect of the present invention, a fuel supply apparatus is provided that includes: mixing means for generating an oil mixture by arbitrarily combining and mixing a plurality of types of fuel oils including a heat resistant fuel oil; fuel temperature detecting means for separately detecting temperatures of the fuel oils before the mixing means mixes the fuel oils; heating means for heating only the heat resistant fuel oil among the fuel oils before the mixing means mixes the fuel oils; and control means for controlling, based on a detection result of the fuel oil temperature detecting means, the heating means such that the temperature of the oil mixture obtained by mixing the fuel oils becomes a temperature that is set in advance.

In accordance with this configuration, non-heat resistant fuel oil and heat resistant fuel oil are mixed after the heat resistant fuel oil is heated, without directly heating non-heat resistant fuel oil. Therefore, the viscosity of the oil mixture can be adjusted without degrading the non-heat resistant fuel oil by oxidation of the non-heat resistant fuel oil constituting the oil mixture with the heat resistant fuel oil.

The fuel supply apparatus preferably further includes viscosity detecting means for detecting a viscosity of the oil mixture generated by the mixing means. Based on a detection result of the viscosity detecting means, the control means preferably controls a mixture ratio or a heating temperature of the heat resistant fuel oil that is heated by the heating means, such that the viscosity of the oil mixture is kept in a viscosity range that is set in advance.

In accordance with this configuration, by detecting the viscosity of the oil mixture after the fuel oils are mixed, the feedback control can be performed such that the viscosity of the oil mixture is kept in the range of the predetermined viscosity condition.

Also, the fuel supply apparatus preferably further includes: oil mixture temperature detecting means for detecting a temperature of the oil mixture that is generated by mixing the fuel oils using the mixing means; and memory means for storing fuel maps each defining the relationship between a viscosity of the oil mixture and mixture ratios of the fuel oils at each of different temperatures of the fuel oils. Based on a detection result of the oil mixture temperature detecting means and the fuel maps stored in the memory means, the control means preferably controls the mixture ratio or a heating temperature of the heat resistant fuel oil, such that the viscosity of the oil mixture is kept in a viscosity range that is set in advance.

In accordance with this configuration, after mixing the fuel oils, the feedback control can be performed such that the viscosity of the oil mixture is kept in the range of the predetermined viscosity condition, based on the temperature detection result of the oil mixture and the fuel map set for each temperature condition of the oil mixture.

The fuel supply apparatus preferably further includes: a plurality of fuel tanks each storing different one of the fuel oils; and a plurality of supply passages each connected to different one of the fuel tanks. The heating means is preferably provided in the fuel tank that stores only the heat resistant fuel oil or in the supply passage that supplies only the heat resistant fuel oil.

In accordance with this configuration, since only the heat resistant oil is heated, other non-heat resistant fuel oils are not oxidized and degraded by heating.

In accordance with another aspect of the present invention, a fuel supply method is provided that includes: fuel oil temperature detecting step for separately detecting temperatures of a plurality of fuel including a heat resistant fuel oil; heating step for heating only the heat resistant fuel oil among the fuel oils based on a detection result of the fuel oil temperature detecting step such that the temperature of the oil mixture obtained by mixing the fuel oils becomes a temperature that is set in advance; and mixing step for generating the oil mixture by arbitrarily combining and mixing the fuel oils including the heat resistant fuel oil.

In accordance with this configuration, the same advantages as those of the above fuel supply apparatus are achieved.

BRIEF DESCRIPTION OF THE DRAWINGS

FIG. 3(a) is a fuel map showing the correspondence relationship among the mixture ratio of a vegetable oil and an A heavy oil, the viscosity of the oil mixture, and the temperature of the oil mixture; and FIG. 3(b) is a fuel map showing the correspondence relationship among the mixture ratio of the fatty acid methyl ester and the A heavy oil, the viscosity of the oil mixture, and the temperature of the oil mixture.

BEST MODE FOR CARRYING OUT THE INVENTION

One embodiment of the present invention will now be described with reference to the drawings.

Figure 1:
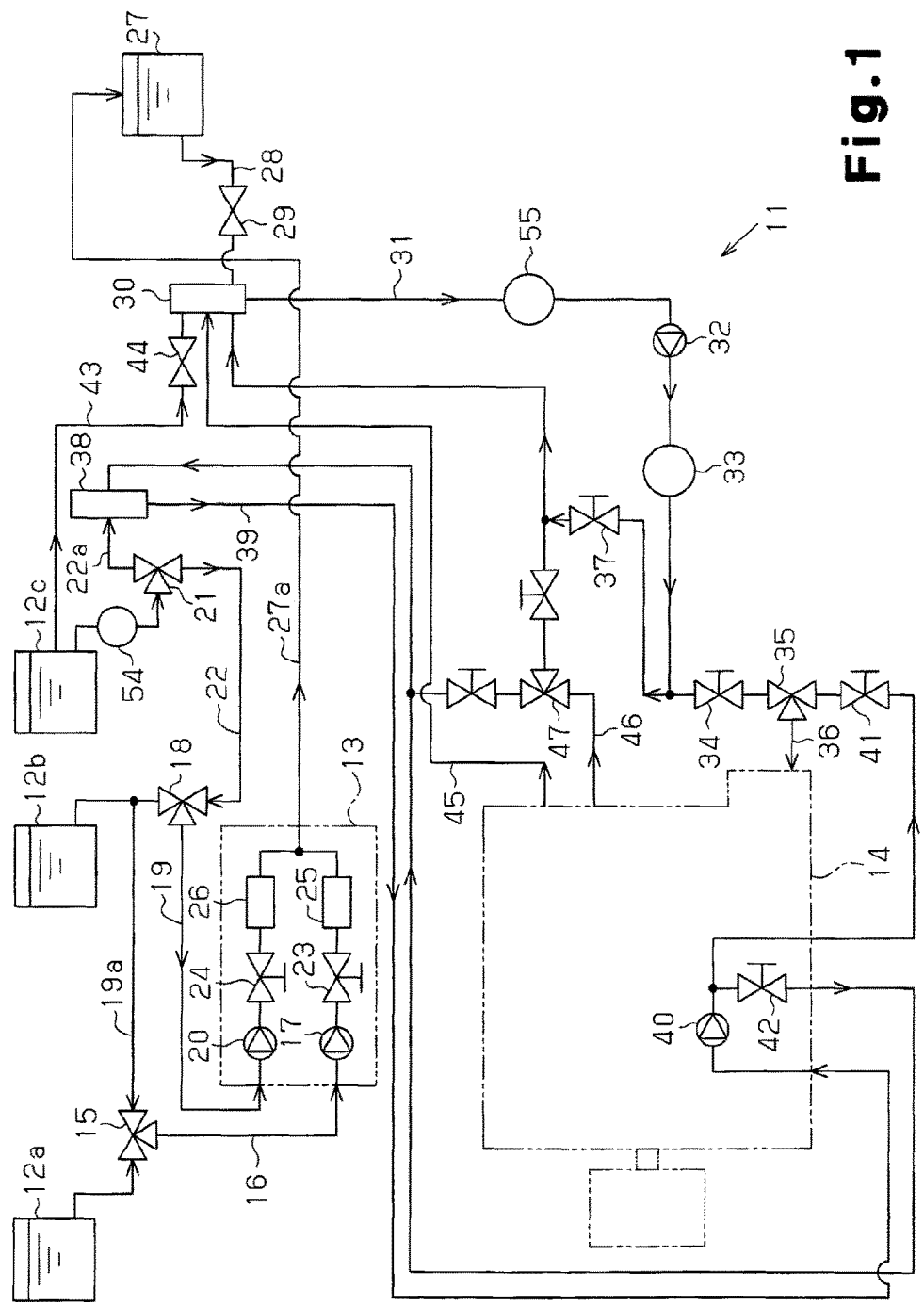
FIG. 1 is a system diagram schematically showing a fuel supply apparatus according to one embodiment of the present invention.

As shown in FIG. 1, a fuel supply apparatus 11 according to the present embodiment includes first to third fuel tanks 12a, 12b, 12c, a blender 13, and an engine 14 serving as a drive source. The first to third fuel tanks 12a, 12b, 12c store, as fuel oils, a vegetable oil, a fatty acid methyl ester, and an A heavy oil, respectively. The blender 13 functions as mixing means for mixing fuel oils sent from the fuel tanks 12a, 12b, 12c. The engine 14 receives and is driven by the oil mixture mixed by the blender 13. Among the fuel oils, the vegetable oil stored in the first fuel tank 12a and the fatty acid methyl ester stored in the second fuel tank 12b are non-heat resistant fuel oils, while the A heavy oil stored in the third fuel tank 12c is a heat resistant fuel oil. The non-heat resistant fuel oil refers to a fuel oil that is highly likely to be oxidized and degraded when directly heated, while the heat resistant fuel oil refers to a fuel oil that is unlikely to be oxidized and degraded when directly heated.

First, a piping structure for supplying fuel oils from the fuel tanks 12a, 12b, 12c to the blender 13 will be described.

An upstream end of a supply passage 16 is connected to the first fuel tank 12a, which stores vegetable oil, and a downstream end of the supply passage 16 is located inside the blender 13. An electromagnetic type first three-way valve 15 is provided in the supply passage 16. A first pressurizing pump 17 is located in a part of the supply passage 16 that is located inside the blender 13. The first pressurizing pump 17 functions as a fuel feed pump. Thus, when the first three-way valve 15 of the supply passage 16 connects the first fuel tank 12a and the blender 13 to each other, the vegetable oil in the first fuel tank 12a is sent to the blender 13 through the supply passage 16 while being pressurized by the operation of the first pressurizing pump 17.

An upstream end of a supply passage 19 is connected to the second fuel tank 12b, which stores fatty acid methyl ester, and a downstream end of the supply passage 19 is located inside the blender 13. An electromagnetic type second three-way valve 18 is provided in the supply passage 19. A second pressurizing pump 20 is located in a part of the supply passage 19 that is located inside the blender 13. The second pressurizing pump 20 functions as a fuel feed pump. A branch supply passage 19a branches off a part of the supply passage 19 between the second fuel tank 12b and the second three-way valve 18. The branch supply passage 19a is connected to the supply passage 16 with the first three-way valve 15.

Therefore, when the first three-way valve 15 of the supply passage 16 connects the second fuel tank 12b and the blender 13 to each other, and the second three-way valve 18 of the supply passage 19 disconnects the second fuel tank 12b and the blender 13 from each other, the fatty methyl ester in the second fuel tank 12b is sent to the blender 13 through the branch supply passage 19a and the supply passage 16 while being pressurized by the operation of the first pressurizing pump 17. On the other hand, when the first three-way valve 15 of the supply passage 16 disconnects the second fuel tank 12b and the blender 13 from each other, and the second three-way valve 18 of the supply passage 19 connects the second fuel tank 12b and the blender 13 to each other, the fatty methyl ester in the second fuel tank 12b is sent to the blender 13 through the supply passage 19 while being pressurized by the operation of the second pressurizing pump 20.

An upstream end of a supply passage 22 is connected to the second fuel tank 12c, which stores A heavy oil, and a downstream end of the supply passage 22 is connected to the supply passage 19 with the second three-way valve 18 provided in the supply passage 19. An electromagnetic type third three-way valve 21 is provided in the supply passage 22. Thus, when the third three-way valve 21 of the supply passage 22 and the second three-way valve 18 of the supply passage 19 connect the third fuel tank 12c and the blender 13 to each other, the A heavy oil in the third fuel tank 12c is sent to the blender 13 through the supply passage 22 and the supply passage 19 while being pressurized by the operation of the second pressurizing pump 20. The fuel tanks 12a to 12c and the blender 13 are connected by the above described piping structure. Therefore, three types of fuel oils (vegetable oil, fatty acid methyl ester, A heavy oil), which are stored in the fuel tanks 12a to 12c, respectively, can be mixed in the blender 13 in a desired combination by switching the states of the three-way valves 15, 18, 21.

A heat exchanger 54 is provided in a part of the supply passage 22 that is upstream of the third three-way valve 21. The heat exchanger 54 functions as heating means for heating A heavy oil supplied from the third fuel tank 12c. The heat exchanger 54 has heat exchanger tubes (not shown) surrounding the supply passage 22. High-temperature water is circulated through the heat exchanger tubes. The heat exchanger 54 indirectly heats the supply passage 22 through heat radiation from the high-temperature water.

First and second flow regulating valves 23, 24 and first and second flow meters 25, 26 are provided at the downstream portions of the supply passage 16 and the supply passage 19 in the blender 13, respectively. The flow regulating valves 23, 24 function as flow regulating means for regulating the flow rate of fuel oil, and the flow meters 25, 26 measures the flow rate of the fuel oil. The mixture ratios of fuel oils mixed by the blender 13 can be adjusted by individually adjusting the first and second flow regulating valves 23, 24 on the supply passages 16, 19. The supply passages 16, 19 converge at a position downstream of the flow meters 25, 26 to form a combined passage 27a. The combined passage 27a is connected to an inlet port of an oil mixture tank 27 for storing oil mixture. The outer wall of the oil mixture tank 27 is covered with heat insulating material. The oil mixture tank 27 therefore retains heat of the oil mixture stored therein.

The piping structure for supplying fuel oil to the engine 14 will now be described.

An upstream end of a supply passage 28 is connected to an outlet of the oil mixture tank 27, which stores oil mixture, and a downstream end of the supply passage 28 is connected to a first return chamber 30. The first return chamber 30 functions as circulating means for circulating some of the oil mixture with the engine 14. A first on-off valve 29 is provided on a part of the supply passage 28 between the oil mixture tank 27 and the first return chamber 30.

An upstream end of a supply passage 31 is connected to an outlet of the first return chamber 30. A fourth temperature sensor 55, a third pressurizing pump 32, and a viscometer 33 are provided on the supply passage 31. The fourth temperature sensor 55 functions as oil mixture temperature detecting means for detecting the temperature of oil mixture flowing through the supply passage 31. The third pressurizing pump 32 supplies the oil mixture to the downstream side. The viscometer 33 functions as viscosity detecting means for detecting the viscosity of the oil mixture. The downstream portion of the supply passage 31 is bifurcated. One of the bifurcated portions is connected to an upstream end of a supply passage 36, which is connected to a fuel port of the engine 14 with a second on-off valve 34 and an electromagnetic type fourth three-way valve 35. The other one of the bifurcation is connected to an inlet of the first return chamber 30 with a third on-off valve 37.

Therefore, when the first on-off valve 29, the second on-off valve 34, and the fourth three-way valve 35 connect the oil mixture tank 27 and the engine 14 to each other, and third on-off valve 37 is closed, the oil mixture stored in the oil mixture tank 27 is sent to the supply passage 31 while being pressurized by the operation of the third pressurizing pump 32. The oil mixture is then supplied to the engine 14 through the supply passage 31 and the supply passage 36. Some of the oil mixture to be supplied to the engine 14 is returned to the first return chamber 30 by opening the third on-off valve 37 as necessary. In this manner, the oil mixture is supplied while being circulated.

The supply passage 22, the upstream end of which is connected to the third fuel tank 12c storing A heavy oil, is connected to an inlet of a second return chamber 38 with the third three-way valve 21 and a branch supply passage 22a. The second return chamber 38 functions as circuiting means when circulating and supplying the A heavy oil, as well as temporary storing means when supplying only the A heavy oil to the engine 14. An upstream end of a supply passage 39 is connected to the outlet of the second return chamber 38. A fourth pressurizing pump 40 is provided on the supply passage 39. The fourth pressurizing pump 40 supplies the A heavy oil to the downstream side. A downstream portion of the supply passage 39 is bifurcated. One of the bifurcated portions is connected to the fourth three-way valve 35 with a third on-off valve 41, and is connected to the upstream end of the supply passage 36, which communicates with the fuel port of the engine 14 with the fourth three-way valve 35. The other one of the bifurcation is connected to an inlet of the second return chamber 38 with a fourth on-off valve 42.

The operation for directly supplying the A heavy oil to the engine 14 will now be described. For example, if the viscosity of oil mixture is significantly high at the start of the operation of the fuel supply apparatus 11 due to, for example, a low external temperature, the oil mixture cannot be used as fuel. In this case, the fourth pressurizing pump 40 is operated so as to supply the A heavy oil, which has an improved starting performance. The operation of the fourth pressurizing pump 40 sends the A heavy oil stored in the third fuel tank 12c to the supply passage 39, while being pressurized. The A heavy oil is then supplied to the engine 14 through the supply passage 39 and the supply passage 36. Accordingly, it is possible to supply only the A heavy oil to the engine. Some of the A heavy oil to be supplied to the engine 14 is returned to the second return chamber 38 by selectively closing and opening as necessary the on-off valves 41, 42 provided in the bifurcated portions in the downstream portion of the supply passage 39. In this manner, the A heavy oil is supplied to the engine 14 while being circulated between the second return chamber 38 and the engine 14.

The third fuel tank 12c, which stores the A heavy oil, is connected to the first return chamber 30, which circulates the oil mixture, with a supply passage 43 and a fifth on-off valve 44. When the fifth on-off valve 44 on the supply passage 43 is open, the A heavy oil is added to the oil mixture circulated through the first return chamber 30. This allows the mixture ratio of the A heavy oil in the oil mixture to be increased.

The supply passage 36 for supplying the oil mixture or the A heavy oil to the fuel port of the engine 14 is bifurcated into a supply passage 45 and a supply passage 46 with a switching valve (not shown) inside the engine 14. The supply passage 45 is connected to the first return chamber 30, which functions as temporary storing means when circulating and supplying the oil mixture. The supply passage 46 is further bifurcated with a fifth three-way valve 47, which is an electromagnetic type. One of the bifurcated portions is connected to the first return chamber 30, which functions as temporary storing means, when circulating and supplying the oil mixture. The other bifurcation is connected to the second return chamber 38, which functions as temporary storing means when circulating and supplying the A heavy oil.

Therefore, when the oil mixture is supplied to the engine 14, some of the supplied oil mixture is sent to the first return chamber 30 through the supply passage 45, so as to be mixed with the oil mixture supplied from the oil mixture tank 27. Likewise, when only the A heavy oil is supplied to the engine 14, some of the supplied A heavy oil is sent to the second return chamber 38 through the supply passage 46, so as to be mixed with the A heavy oil supplied from the third fuel tank 12c. Further, the A heavy oil that has been supplied alone to the engine 14 can be mixed with the oil mixture in the first return chamber 30 by switching the communication state of the fifth three-way valve 47 as necessary.

The control configuration of the fuel supply apparatus 11 of the present embodiment will now be described.

Figure 2:
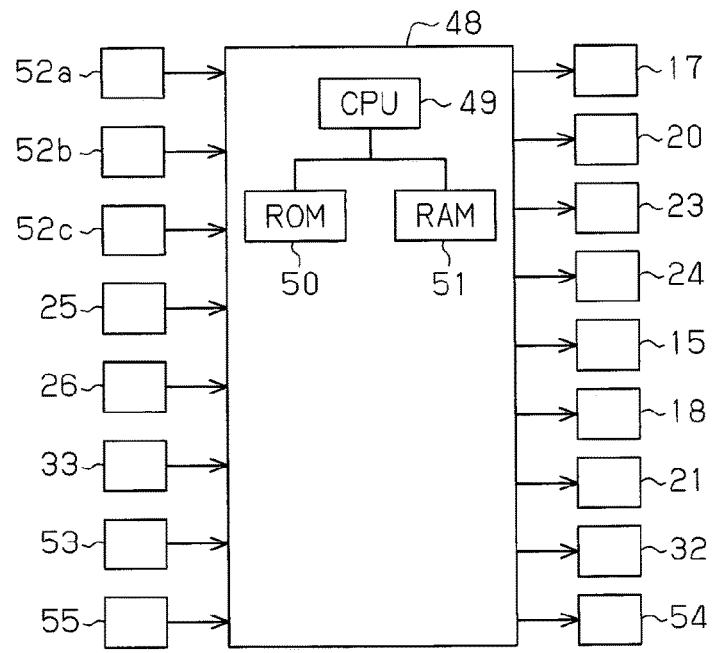
FIG. 2 is a block diagram illustrating a control device according to the embodiment of the present invention.
Figure 2:
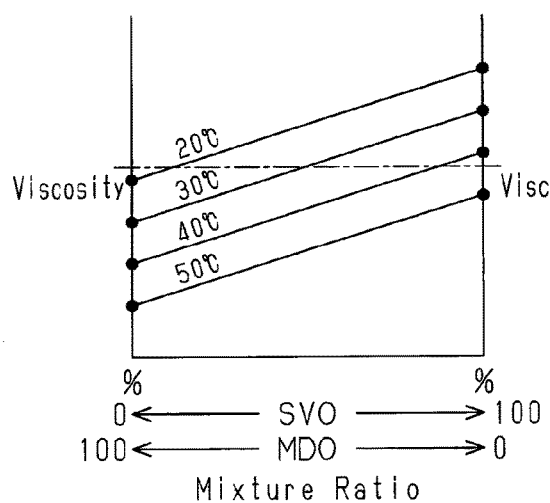
Figure 2:
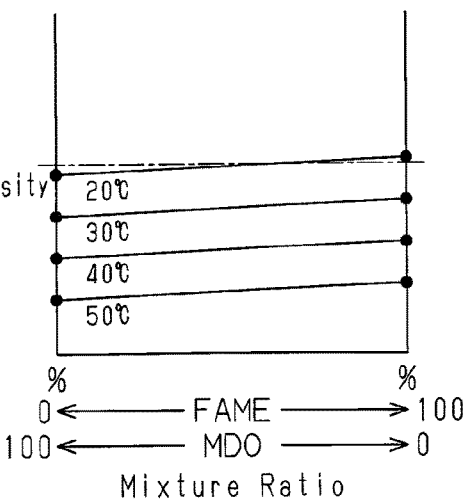

As shown in FIG. 2, the fuel supply apparatus 11 includes a control device 48 that controls the apparatus 11. The control device 48 is constituted mainly by a controller having a CPU 49 functioning as control means, a ROM 50, and a RAM 51, and a drive circuit (not shown), which drives various devices (such as the on-off valves and the pressurizing pumps). The ROM 50, which functions as memory means, stores fuel maps (see FIG. 3) defining the relationship between the viscosity of the oil mixture and the mixture ratios of the fuel oils at different temperatures of each fuel oil (vegetable oil, fatty acid methyl ester, A heavy oil). The fuel maps include various types of fuel maps defined by combinations of different fuel oils. Further, the ROM 50 stores reference maps (not shown) of various types each corresponding to one of the fuel maps. Each reference map represents the relationship between the mixture ratios and the fuel prices for each combination of the fuel oils. The RAM 51 stores various types of information, which is rewritten as necessary during the operation of the fuel supply apparatus 11.

An input interface (not shown) of the control device 48 is connected to first to third temperature sensors 52*a*, 52*b*, 52*c*, which are fuel oil temperature detecting means located in the fuel tanks 12*a*, 12*b*, 12*c*, the first and second flow meters 25, 26 for measuring the flow rate of fuel oils mixed in the blender 13, the fourth temperature sensor 55 for measuring the temperature of the oil mixture, and a process input device 53. The input device 53, which functions as mixture ratio setting means, sets the combination of the fuel oils of the oil mixture, the viscosity condition of the oil mixture, and the initial values of the mixture ratios of the fuel oils of the oil mixture, in a step prior to the generation of the oil mixture. The control device 48 receives signals from the first to fourth temperature sensors 52*a*, 52*b*, 52*c*, 55, the first and second flow meters 25, 26, the viscometer 33, and the input device 53.

On the other hand, the output interface (not shown) of the control device 48 is connected to the heat exchanger 54, the third pressurizing pump 32, which supplies oil mixture, the first and second pressurizing pumps 17, 20 provided in the blender 13, the first and second flow regulating valves 23, 24, and the first to third three-way valves 15, 18, 21 located upstream of the blender 13. The heat exchanger 54 individually heats the A heavy oil before mixing fuel oils to generate the oil mixture. The heat exchanger 54 is provided to individually heat the A heavy oil before mixing the fuel oils. The control device 48 separately controls the heat exchanger 54, the first to third pressurizing pumps 17, 20, 32, the first and second flow regulating valves 23, 24, and the first to third three-way valves 15, 18, 21 based on signals from the first to fourth temperature sensors 52*a*, 52*b*, 52*c*, 55, the first and second flow meters 25, 26, the viscometer 33, and the input device 53. Accordingly, the temperature of the oil mixture mixed in the blender 13, the combination of the fuel oils in the oil mixture, and the mixture ratio of each fuel oil are controlled.

Next, the fuel maps stored in the ROM 50 will now be described with reference to FIG. 3.

The map shown in FIG. 3(*a*) is a fuel map of an oil mixture that is generated by mixing vegetable oil (labeled as SVO in the drawing) and A heavy oil (labeled as MDO in the drawing). In this map, the higher the temperature of the oil mixture, the lower the viscosity of the oil mixture becomes. Also, the higher the mixture ratio of the vegetable oil (SVO) in the oil mixture, the higher the viscosity of the oil mixture becomes.

The map of FIG. 3(*b*) is a fuel map of an oil mixture that is generated by mixing fatty acid methyl ester (FAME) and the A heavy oil (MDO). In this map, the higher the temperature of the oil mixture, the lower the viscosity of the oil mixture becomes. Also, the higher the mixture ratio of the fatty acid methyl ester in the oil mixture, the higher the viscosity of the oil mixture becomes.

The fuel supply method of the fuel supply apparatus 11 of the present embodiment will now be described.

When supplying the oil mixture to the engine 14 as fuel, the fuel supply apparatus 11 generates the oil mixture through the following steps. Specifically, the fuel supply method includes a fuel oil temperature detection step for separately detecting the temperatures of the fuel oils, and a heating step, in which, based on the detection result of the fuel oil temperature detection step, only the A heavy oil, which is a heat resistance fuel oil among the fuel oils, is heated such that the temperature of the oil mixture generated by mixing the fuel oils satisfies a predetermined temperature condition. The fuel supply method includes an oil mixture generating step for mixing a plurality of types of fuels including the A heavy oil, which has been heated in the heating step, thereby generating the oil mixture, and an adjusting step for adjusting the condition for heating the A heavy oil in the heating process in accordance with the viscosity of the oil mixture generated in the oil mixture generating step.

First, in an initial step that precedes all the above steps, the CPU 49 sets the combination of the fuel oils in the oil mixture, the viscosity condition of the oil mixture, and initial values of the mixture ratios of the fuel oils in the oil mixture based on the signals sent from the input device 53. Specifically, the CPU 49 sets the viscosity condition of the oil mixture appropriate for use in the engine 14 of the present embodiment.

Subsequently, in the fuel oil temperature detecting step, the CPU 49 detects the temperature of each fuel oil based on signals sent from the first to third temperature sensors 52*a*, 52*b*, 52*c* provided in the fuel tanks 12*a*, 12*b*, 12*c*, respectively. The detected temperatures of the fuel oils are temporarily stored in the RAM 51.

Next, in the heating step, the CPU 49 reads from the ROM 50 a fuel map that corresponds to the combination of the fuel oils in the set oil mixture. Specifically, as shown in FIG. 3(*a*) or 3(*b*), the CPU 49 reads a fuel map that defines the relationship between the viscosity of the oil mixture to be generated by mixing the fuel oils and the mixture ratios of the fuel oils for each temperature condition of the oil mixture. The CPU 49 temporarily stores the read fuel map in the RAM 51.

Subsequently, under the condition of the mixture ratios of the oil mixture set in the initial step, the CPU 49 computes a temperature of the oil mixture that satisfies the viscosity condition set in the same manner, by referring to the read fuel map. While referring to properties such as heat capacities of the fuel oils to be mixed, the CPU 49 performs thermal calculation to obtain a temperature of the A heavy oil that is required to obtain the computed temperature of the oil mixture. Based on the computation results, the CPU 49 controls the temperature of the high-temperature water circulated in the heat exchanger tubes of the heat exchanger 54, thereby heating the A heavy oil to a predetermined temperature.

Next, in the oil mixture generating step, the CPU 49 switches the valve states of the three-way valves 15, 18, 21 to generate an oil mixture having the combination and mixture ratios of the fuel oils set in the initial step, and controls the operating states of the pressurizing pumps 17, 20. The CPU 49 supplies to the engine 14 the oil mixture that has been stored in the oil mixture tank 27 by the operation of the third pressurizing pump 32. Accordingly, the operation of the engine 14 is started.

Subsequently, in the adjusting step, the CPU 49 detects the viscosity of the oil mixture at predetermined intervals after the fuel supply apparatus 11 and the engine 14 are started. The viscosity of the oil mixture can be detected by two methods. The first method is that the CPU 49 detects the viscosity of the oil mixture based on a detection signal of the viscometer 33.

The second method is that the CPU 49 detects the temperature of the oil mixture based on a detection signal of the fourth temperature sensor 55. Based on the detected temperature of the oil mixture, the CPU 49 computes the viscosity of the oil mixture by referring to the fuel map that has been read in the heating step. Specifically, the CPU 49 first computes the mixture ratios of the fuel oils and the volume of the oil mixture stored in the oil mixture tank 27 based on data obtained by measuring at all times the amount of the fuel oils sent to the oil mixture tank 27 through the combined passage 27a and the amount of the oil mixture sent to the engine 14 through the supply passage 28. The CPU 49 computes the viscosity of the oil mixture by referring to the fuel map based on the computed mixture ratios of the fuel oils in the oil mixture and the temperature of the oil mixture detected by the fourth temperature sensor 55.

Next, the CPU 49 determines whether the detected or computed viscosity of the oil mixture satisfies the viscosity condition of the oil mixture, which has been set in the initial step.

When a sufficient period of time has elapsed since the operation of the apparatus is started, the piping for supplying the fuel oils has been heated to a temperature equivalent to the temperature of the fuel oils. Thus, the oil mixture supplied to the engine 14 satisfies the viscosity condition that has been set in the initial step. However, immediately after the operation of the apparatus is started, the temperature of the piping for supplying the fuel oils is approximately at a room temperature, which is lower than the temperature of the fuel oils. Therefore, the temperature of the oil mixture supplied through the piping is lowered below an expected temperature. Such a drop of the temperature of the oil mixture can cause the oil mixture to stop satisfying the viscosity condition set in the initial setting.

The CPU 49 compares the detected or computed viscosity of the oil mixture with a threshold value of the viscosity condition of the oil mixture set in advance, thereby determining whether the viscosity of the oil mixture satisfies a viscosity condition of the oil mixture appropriate for being supplied to the engine 14.

If the determination is positive, the CPU 49 determines that the viscosity condition of the oil mixture supplied to the engine 14 is appropriate, and continues operating the apparatus while maintaining the condition for heating the A heavy oil in the heating step.

If the determination is negative, the CPU 49 determines that the viscosity condition of the oil mixture supplied to the engine 14 is not appropriate, and changes the condition for heating the A heavy oil in the heating step.

First, the CPU 49 computes the temperature and volume of oil mixture to be added to the oil mixture tank 27 based on the states such as the volume of the oil mixture in the oil mixture tank 27 computed in the adjusting step. While referring to properties such as heat capacities of the fuel oils to be mixed, the CPU 49 performs thermal calculation to obtain a temperature of the A heavy oil that is required to obtain the computed temperature of the oil mixture. Based on the computation result, the CPU 49 changes the setting of the condition for heating the A heavy oil in the heating step. Thereafter, the CPU 49 continues the operation of the apparatus while applying the changed heating condition.

The present embodiment has the following advantages.

(1) In the initial step, in which the oil mixture is generated by mixing the fuel oils including the heat resistant fuel oil, the CPU 49 heats only the heat resistant fuel oil among the fuel oils, or the A heavy oil, based on the detection results of the first to third temperature sensors 52a, 52b, 52c for detecting the temperatures of the fuel oils. At this time, the CPU 49 heats the A heavy oil such that the temperature of the oil mixture generated by mixing the fuel oils satisfies the viscosity condition of the oil mixture set through the input device 53. Therefore, the viscosity of the oil mixture can be adjusted without directly heating the non-heat resistant fuel oils, that is, the vegetable oil and the fatty acid methyl ester.

(2) The CPU 49 detects the viscosity of the oil mixture generated by mixing the fuel oils using the viscometer 33. The CPU 49 controls the condition for heating the heat resistant fuel oil such that the detection result satisfies the viscosity condition of the oil mixture set through the input device 53. Thus, feedback control can be performed such that the viscosity of the oil mixture is kept in a range of the predetermined viscosity condition after the fuel oils are mixed.

(3) The temperature of the oil mixture generated by mixing the fuel oils is detected by the fourth temperature sensor 55. The ROM 50 stores the fuel maps, each of which defines the relationship between the viscosity of the oil mixture generated by mixing the fuel oils and the mixture ratios of the fuel oils for generating the oil mixture of the viscosity for each temperature condition of the oil mixture. Based on the detection result of the fourth temperature sensor 55 and the fuel map, the CPU 49 controls the condition for heating the heat resistant fuel oil such that the viscosity condition of the oil mixture set through the input device 53 is satisfied. Thus, feedback control can be performed such that the viscosity of the oil mixture is kept in a range of the predetermined viscosity condition without detecting the viscosity of the oil mixture.

(4) The heat exchanger 54 for heating the heat resistant fuel oil is provided on the supply passage 22 for supplying only the heat resistant fuel oil. Therefore, since only the heat resistant oil is heated, other non-heat resistant fuel oils are not oxidized and degraded by heating.

The above described embodiment may be modified as follows.

Instead of adjusting the condition for heating the heat resistant fuel oil in accordance with the viscosity of the oil mixture generated by mixing the fuel oils, the mixture ratio of the heat resistant fuel oil that is heated may be adjusted.

One of the viscometer 33, which detects the viscosity of the oil mixture, and the fourth temperature sensor 55, which detects the temperature of the oil mixture, may be omitted.

The heat exchanger 54, which functions as heating means, may be located in the third fuel tank 12c, which stores the heat resistant fuel oil.

As heating means for heating the heat resistant fuel oil, a heater that directly heats the fuel oil may be provided.

Instead of being connected to the second three-way valve 18, the downstream end of the supply passage 22 may be directly inserted into the blender 13. In this case, additional pressurizing pump, flow regulating valve, and flow meter may be provided in the inserted portion of the supply passage 22.

The fuel maps may be stored in an external storage device and read by the control device 48 as necessary.

The vegetable oil, which is the fuel oil stored in the first fuel tank 12a, may be, for example, palm oil, rapeseed oil, soybean oil, or sunflower seed oil.

The fatty acid methyl ester, which is the fuel oil stored in the second fuel tank 12b, may be replaced by an oil that has a fatty acid methyl ester composition obtained through the methyl esterification of the above described vegetable oil, an animal oil such as a fish oil, and edible oil waste of these oils, by an alkali catalyst method or an oxygen method.

The A heavy oil, which is used the fuel oil stored in the third fuel tank 12c, may be replaced by, for example, Kerosene, a light oil, a B heavy oil, or a C heavy oil.

The fuel oils stored in the fuel tanks 12a to 12c may be two or more types of oils other than the fuel oils shown above (the vegetable oil, the fatty acid methyl ester, the A heavy oil), as long as the combination includes a heat resistant fuel oil and a non-heat resistant fuel oil.

The invention claimed is:

1. A fuel supply method comprising:
   fuel oil temperature detecting step including separately detecting temperatures of a plurality of fuel including a heat resistant fuel oil and a non-heat resistant fuel oil, wherein the heat resistant fuel oil is selected from a group consisting of an A heavy oil, a B heavy oil, a C heavy oil, kerosene and a light oil;
   wherein the non-heat resistant oil is selected from a group consisting of a vegetable oil and biodiesel;
   heating step including heating only the heat resistant fuel oil among the fuel oils based on a detection result of the fuel oil temperature detecting step such that the temperature of the oil mixture obtained by mixing the fuel oils becomes a temperature that is set in advance; and
   mixing step including generating the oil mixture by arbitrarily combining and mixing the fuel oils including the heat resistant fuel oil.

2. The method of claim 1, comprising circulating the oil mixture within an engine, wherein the oil mixture comprises the heat resistant fuel oil selected from the group consisting of an A heavy oil, a B heavy oil, a C heavy oil, Kerosene, and a light oil, and the non-heat resistant oil is selected from the group consisting of a vegetable oil and biodiesel fuel.

* * * * *